United States Patent

Rehwinkel et al.

[11] Patent Number: 5,106,238
[45] Date of Patent: Apr. 21, 1992

[54] DEVICE FOR TRANSFERRING SOLID PARTICLES

[75] Inventors: Heiko Rehwinkel, Bottrop; Horst Möllenhoff, Mülheim/Ruhr; Hans-Joachim Meier, Alpen/Mentzelen; Gerd Morawski, Essen, all of Fed. Rep. of Germany

[73] Assignee: Deutsche Babcock Werke Aktiengesellschaft, Oberhausen, Fed. Rep. of Germany

[21] Appl. No.: 577,775

[22] Filed: Sep. 5, 1990

[30] Foreign Application Priority Data

Sep. 14, 1989 [DE] Fed. Rep. of Germany ....... 3930769

[51] Int. Cl.$^5$ .................... B65G 53/66; B65G 53/40; B65G 53/48
[52] U.S. Cl. ........................... 406/24; 406/33; 406/53; 406/109
[58] Field of Search .............. 406/53, 28, 33, 23, 406/24, 109, 168, 169, 173, 32

[56] References Cited

U.S. PATENT DOCUMENTS

| 4,572,726 | 2/1986 | Van Abbema | 406/109 X |
| 4,599,016 | 7/1986 | Medemblik | 406/173 X |

FOREIGN PATENT DOCUMENTS

| 310533 | 3/1918 | Fed. Rep. of Germany | 406/168 |
| 12012q240 | 9/1965 | Fed. Rep. of Germany | 406/169 |
| 3721476 | 12/1988 | Fed. Rep. of Germany | 406/28 |
| 82526 | 5/1985 | Japan | 406/53 |
| 386926 | 4/1965 | Switzerland | 406/169 |
| 924328 | 4/1963 | United Kingdom | 406/28 |

Primary Examiner—Margaret A. Focarino
Assistant Examiner—James M. Kannofsky
Attorney, Agent, or Firm—Max Fogiel

[57] ABSTRACT

A device for transferring solid particles from an area of higher pressure to one of lower pressure. A stack-up section (3) between the areas is full of particles and large enough to reduce the current of gas flowing through the open stack-up section from the area of higher pressure as a result of the pressure loss that occurs in the stack-up section to a level that prevents pneumatic conveyance of the particles. A conveyor is in or at the end of the stack-up section.

1 Claim, 2 Drawing Sheets

5,106,238

DEVICE FOR TRANSFERRING SOLID PARTICLES

BACKGROUND OF THE INVENTION

The invention concerns a device for transferring solid particles from an area of higher pressure to one of lower pressure.

Using a system of locks to transfer dust separated from a gas in a cyclone is known (U.S. Pat. No. 4 516 989). The known system of locks consists of a series of three cones that communicate with the cyclone's particle outlet. The middle cone can be alternately subjected to system pressure and atmospheric pressure through pipelines provided with safety valves. Such a system of locks operates discontinuously and involves considerable engineering and controls expenditure.

The object of the present invention is to simplify the generic device for transferring solid particles and allow it to operate continuously.

SUMMARY OF THE INVENTION

The device in accordance with the invention exploits the physical fact that the pressure of a gas decreases when the gas flows through a column of particles in motion. The column of particles forms in the stack-up section, where its impedance is adjusted until the compressed gas that emerges when the end of the stack-up section is opened will effect practically no pneumatic conveyance of the particles. Under these conditions the particles can be extracted by conveyor mechanisms that operate at atmospheric pressure.

BRIEF DESCRIPTION OF THE DRAWINGS

Several embodiments of the invention will now be described with reference to the drawing, wherein.

DESCRIPTION OF THE PREFERRED EMBODIMENTS

Figure 1:
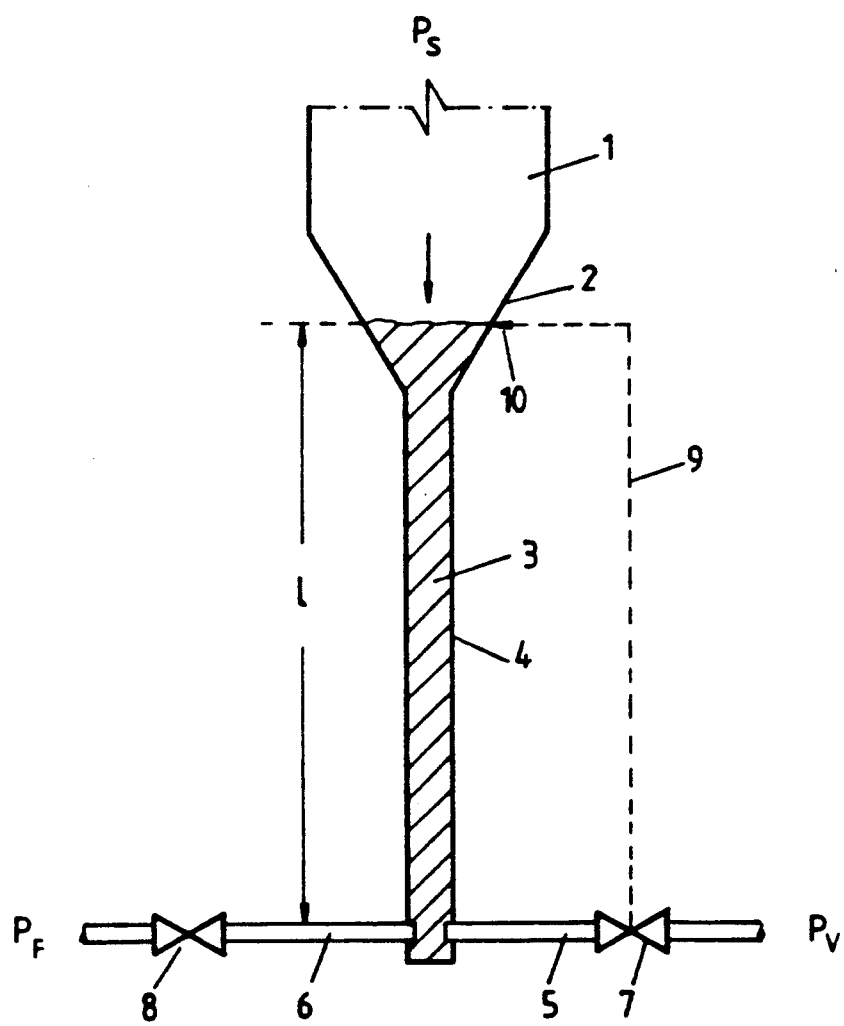
FIG. 1 is a schematic representation of a device for transferring solid particles and FIG. 2 is a schematic representation of another embodiment of the device for transferring solid particles.

The figures illustrate the bottom of a pressurized area, which can be a cyclone 1 that separates solid particles from a gas. The gas is subject to system pressure, which is higher than atmospheric pressure. Cyclone 1 has a funnel-shaped outlet 2 for the separated solid particles to accumulate in.

Particle outlet 2 opens into a stack-up section 3 demarcated by a perpendicular pipe or line 4. At the bottom of stack-up section 3 is a conveyor, pneumatic in FIG. 1. The pneumatic conveyor comprises a line 5 that gas, air for example, is introduced through and another particle-forwarding line 6 that the gas conveys the solid particles through. Gas-introduction line 5 opens into the bottom of stack-up section 3 and particle-forwarding line 6 extends from stack-up section 3 near where line 5 enters. The ends of lines 5 and 6 that are inside stack-up section 3 can be at the same or at different levels.

There is a valve 7 in gas-introduction line 5 and another valve 8 in particle-forwarding line 6. Gas-introduction line valve 7 communicates through a control line 9 with a level sensor 10 at the top of stack-up section 3 or in the particle outlet 2 of cyclone 1. Level controls maintain a column of a prescribed height in stack-up section 3.

Depending on the properties—size, surface characteristics, and compaction for example—of the solid particles, the cross-section and length L of the stack-up section 3 above the conveyor will ensure extensive reduction of the pressure of the gas at the bottom of the section. This reduction is extensive enough to practically eliminate any pneumatic conveyance of the stacked-up solid particles due to the volume of gas flowing through stack-up section 3 when the bottom is open.

How this device operates will now be described. The valves 7 and 8 in pneumatic-conveyor lines 5 and 6 remain closed until the particles stack up in stack-up section 3 to the level prescribed by level sensor 10. Once this level has been attained, particle-forwarding line valve 8 will open, generating a pressure in line 6 that is lower than the pressure $P_S$ in the system that the solid particles are to be transferred from. A certain amount of gas from the pressurized system will, due to this pressure situation, flow through the column of solid particles inside and out through particle-forwarding line 6. The amount of gas is too small to convey any solid particles through line 6. The particles are removed by opening gas-introduction line valve 7. Valve 7 is subject to a pressure $P_V$ that is higher than the pressure $P_F$ (lower than pressure $P_S$) need to transfer the solid particles out. The particles can be transferred out either continuously subject to the level controls or discontinuously with a regular off-and-on switch. The line 4 that demarcates the stack-up section 3 illustrated in FIG. 1 is perpendicular and can even taper out and down. Such an embodiment is appropriate for transferring flow-resistant particles and particles that cake up readily. When the particles are of a type that flows easily, the line 4 that demarcates section 3 can have bends or slope up.

Figure 2:
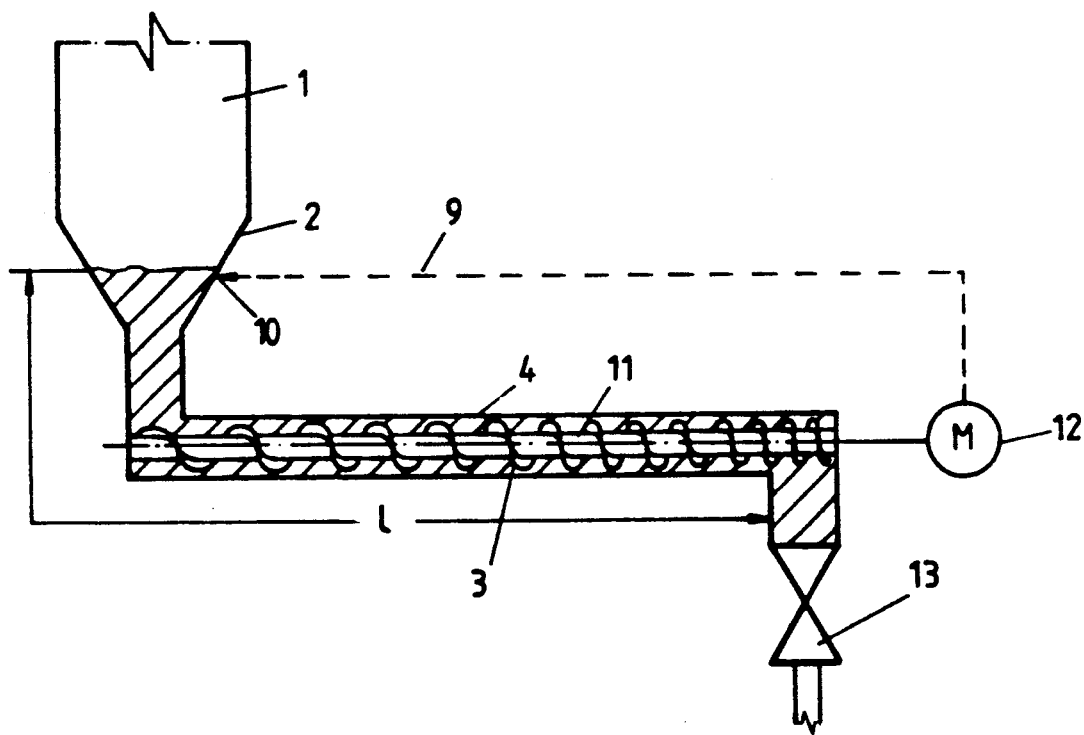

When the particles are of a type that cakes up readily, their flow through stack-up section 3 can be mechanically promoted. FIG. 2 illustrates an embodiment of this type. The stack-up section 3 adjacent to the particle outlet 2 in this embodiment accommodates a mechanical conveyor, a screw conveyor 11 for example. The shaft of screw conveyor 11 is coupled to a motor 12, which is connected to level sensor 10 by way of control line 9. Positioned at the outlet end of the housing of screw conveyor 11 is a valve 13 that initiates the process as described in the foregoing. Since stack-up section 3 is designed along the lines described with reference to the embodiment illustrated in FIG. 1, the gas flowing through stack-up section 3 from the pressurized system will not be able to exert any pneumatic conveyance as long as valve 13 is open.

The solid particles transferred out of stack-up section 3 by screw conveyor 11 can be directly stored in a silo at atmospheric pressure or removed by other conveyors. The advantage of a screw conveyor is that the slope of the threads can be varied over its length to compact the particles at the end of stack-up section 3. The result is considerable deceleration of the undesired current of gas from the pressurized system and through the solid particles, allowing the overall length L of screw conveyor 11 to be effectively decreased.

We claim:

1. An arrangement for transferring solid particles from a first space of higher pressure to a second space of lower pressure comprising: an open column of predetermined dimensions between said first space an said second space to be filled with solid particles for reducing pressure of gas flowing through said open column from said first space of higher pressure due to a pressure loss occurring in said column to a level of pressure preventing pneumatic conveyance of said particles; and conveying means at an end of said column for removing said solid particles from said second space, said pressure loss occurring from gas flow through said column of particles and exiting in substantially predetermined small amount at said end of said conveyor for preventing said pneumatic conveyance of said particles with said first space being open, said column having a length exceeding a predetermined lower level; a level sensor in said column and connected to said conveying means, said conveying means comprising a pneumatic conveyor, said conveying means being operable at atmospheric pressure.

* * * * *